United States Patent [19]

Blahak et al.

[11] 4,228,249
[45] Oct. 14, 1980

[54] SEGMENTED POLYURETHANE RESINS

[75] Inventors: Johannes Blahak; Roland Gipp, both of Cologne; Kuno Wagner; Erwin Müller, both of Leverkusen; Jan Mazanek, Cologne; Peter Haas, Haan, all of Fed. Rep. of Germany

[73] Assignee: Bayer Aktiengesellschaft, Bayerwerk, Fed. Rep. of Germany

[21] Appl. No.: 26,110

[22] Filed: Apr. 2, 1979

Related U.S. Application Data

[62] Division of Ser. No. 875,646, Feb. 6, 1978.

[30] Foreign Application Priority Data

Feb. 15, 1977 [DE] Fed. Rep. of Germany ....... 2706297
Oct. 4, 1977 [DE] Fed. Rep. of Germany ....... 2744599

[51] Int. Cl.$^2$ .............................................. C08G 18/14
[52] U.S. Cl. ..................................... 521/159; 528/60; 528/64
[58] Field of Search ..................... 521/159; 528/60, 64

[56] References Cited

U.S. PATENT DOCUMENTS

| 3,817,940 | 6/1974 | Blahak et al. | 528/79 |
| 3,932,360 | 1/1976 | Cerankowski et al. | 528/64 |

FOREIGN PATENT DOCUMENTS

| 848837 | 9/1960 | United Kingdom | 521/155 |
| 848980 | 9/1960 | United Kingdom | 521/155 |
| 1287691 | 9/1972 | United Kingdom | |

OTHER PUBLICATIONS

Derwent Report of Japanese Patent Publication 21,934/66, Dec. 21, 1966, p. 9.

*Primary Examiner*—Maurice J. Welsh
*Attorney, Agent, or Firm*—Gene Harsh; Joseph C. Gil; R. Brent Olson

[57] ABSTRACT

This invention relates to new high molecular weight polyurethanes which contain a very small amount of urethane and urea groups. These new synthetic resins are built up as block copolymers and contain relatively high molecular weight segments which are derived from high melting and low melting polyols and linked together through ester and/or urethane and/or urea groups.

5 Claims, No Drawings

SEGMENTED POLYURETHANE RESINS

This is a division of application Ser. No. 875,646 filed Feb. 6, 1978.

BACKGROUND OF THE INVENTION

The reaction of polyether polyols and/or polyester polyols in a prepolymer process or a one-shot process with polyisocyanates, chain-lengthening agents and, optionally, auxiliary agents, such as catalysts, stabilizers and blowing agents, to produce polyurethane foams, elastomers, lacquers and adhesives is known. Common to all these synthetic resins is that they contain polyether and/or polyester polyol residues as "soft segments" and urethane and/or urea groups (as obtained by reacting hydroxyl groups of polyether or polyester polyol and, in particular, the hydroxyl and/or amino groups of chain-lengthening agents with polyisocyanates) as "hard segments" coupled as bridging members between these soft segments. The overall properties of such a polymer, and in particular its response to high temperatures and its hardness and long term flexibility, depend to a large extent on the number and properties of these hard segments. As the molecular weight of the polyether or polyester polyol increases, given otherwise identical conditions, the mechanical properties of the resin markedly deteriorate, particularly the tensile strength and structural stability. This deterioration may only be compensated to a very slight extent by increasing the number of hard segments (addition of a larger quantity of chain-lengthening agent). Conversely, a reduction in the quantity of diisocyanates or chain-lengthening agents in such systems (for a given molecular weight of polyurethane) results in a drastic deterioration of all the mechanical properties. The overall properties are therefore worse when a polymer is built up of equimolar quantities of higher molecular weight polyol and polyisocyanate (i.e. without the addition of low molecular weight chain-lengthening agents). Under these conditions, no successful outcome is obtained even if the high molecular weight polyols are linked through other bridging members, such as urea, aromatic ester, amide, imino, sulfone or hydantoin groups.

DESCRIPTION OF THE INVENTION

It has now surprisingly been found that even if the polyurethane molecule contains a relatively small number of urethane or urea groups, synthetic resins having excellent mechanical properties may be obtained if the polymer is built up of relatively high molecular weight segments which are chemically linked together (coupled) by ester, urethane and/or urea groups and which are each derived from at least one high melting or low melting polyol.

A process for the production of cross-linked polyurethane elastomers from a hydroxyl group-containing polyester, diisocyanates and glycols as chain-lengthening agents has been disclosed in German Auslegeschrift No. 1,694,169, in which the hydroxyl group-containing polyester used is one which has a waxy crystalline character at room temperature and a softening point of from 60° to 145° C., which polyester is prepared from only one dicarboxylic acid and only one glycol having aliphatically bound hydroxyl groups, one of the components containing an aromatic or cycloaliphatic ring. Products of this type are characterized by great elasticity and high notched impact strength even at high temperatures, but they have the disadvantage of being extremely hard and brittle at room temperature and lower temperatures. The polyurethane elastomers according to the present invention, on the other hand, have excellent mechanical properties even at low temperatures.

The present invention thus relates to polyurethane resins based on polyisocyanates, polyhydroxyl compounds having a molecular weight of from 500 to 25,000 and, optionally, low molecular weight chain-lengthening agents, which polyurethane resins are characterized in that they contain a total of from about 60 to about 99.8%, by weight, preferably from 70 to 99.5%, by weight, and most preferably from 80 to 99%, by weight, (based on the polyurethane solids content) of the following segments:

(a) from about 40 to about 85%, by weight, preferably from 45 to 80%, by weight, based on the total weight of (a)+(b), of segments corresponding to the following general formula:

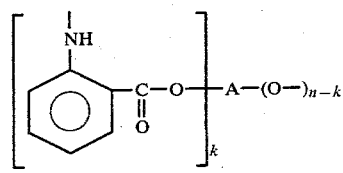

wherein

A represents a k-valent residue obtained by the removal of k hydroxyl groups from a polyol containing n hydroxyl groups and having an average molecular weight of from about 500 to about 5000, preferably from 750 to 5000, most preferably from 1000 to 2500, and a melting point above 80° C., preferably from 110° to 300° C., and most preferably from 150° to 250° C.;

n represents 2 or 3, preferably 2; and k represents an average value of from 0 to n, and preferably from 0 to 0.9 n;

(b) from about 15 to about 60%, by weight, preferably from 20 to 55%, by weight, based on the total weight of (a)+(b), of segments corresponding to the following general formula:

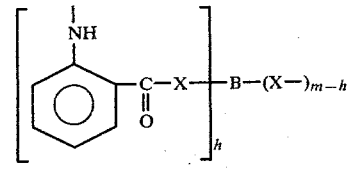

wherein

B represents a residue having a valency of h obtained by the removal of h hydroxyl and/or mercapto group from a polyol or polythiol containing m hydroxyl and/or mercapto groups and having an average molecular weight of from about 500 to about 25,000, preferably from 1000 to 10,000 and a melting point below 60° C., preferably below 40° C.;

m represents an integer of from 2 to 4, preferably 2 or 3, most preferably 2;

h represents an average value of from 0 to m, and preferably from 0 to 0.9 m; and X represents oxygen or sulfur;

the higher molecular weight segments (a) and (b) being linked by low molecular weight bridging members corresponding to the following general formulae:

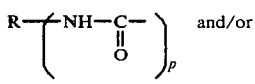 and/or

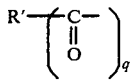

wherein
R represents a residue having a valency of p obtained by removal of p isocyanate groups from a polyisocyanate optionally containing urethane, urea, allophanate, biuret, isocyanurate, uretdione or carbodiimide groups, which residue contains from 2 to 50, preferably from 4 to 40, most preferably from 6 to 15 carbon atoms;
R' represents a residue having a valency of q obtained by the removal of q carboxyl groups from an aliphatic, cycloaliphatic or aromatic polycarboxylic acid having from 2 to 20, preferably from 4 to 10, carbon atoms; and
p and q, which may be the same or different, each represents 2 or 3, and preferably 2.

The present invention also relates to a process for the production of cellular or non-cellular polyurethane resins comprising reacting polyisocyanates, compounds containing at least two isocyanate-reactive hydrogen atoms and having a molecular weight of from 500 to 25,000 and, optionally, low molecular weight chain-lengthening agents optionally in the presence of catalysts, blowing agents and other known additives, characterized in that the compounds containing isocyanate-reactive hydrogen atoms comprise:

(1) a mixture of:
(a) from about 40 to about 85%, by weight, preferably from 45 to 80%, by weight, based on the total weight of (a)+(b), of compounds corresponding to the following general formula:

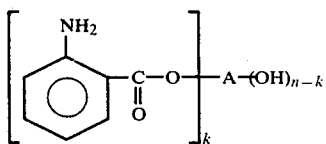

and
(b) from about 15 to about 60%, by weight, preferably from 20 to 55%, by weight, based on the total weight of (a)+(b), of compounds corresponding to the following general formula:

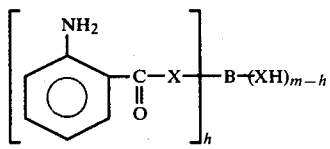

and/or
(2) block copolymers corresponding to the following general formula:

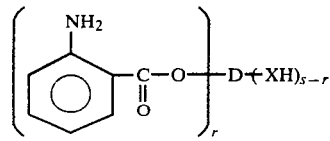

wherein
D represents a residue having a valency of r obtained by the removal of r hydroxyl and/or mercapto groups from a polyol or polythiol having s hydroxyl and/or mercapto groups, which polyol or polythiol is composed of from about 40 to about 85%, by weight preferably from 45 to 80%, by weight, of segments corresponding to the following general formula:

and from about 15 to about 60% by weight, preferably from 20 to 55%, by weight, based on the total weight of the segments, of segments corresponding to the following general formula:

the segments being linked together by residues corresponding to the following general formula:

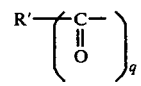

wherein
X represents oxygen or sulfur;
s represents an integer of from 2 to 6, preferably 2 or 3, most preferably 2; and
r has an average value of from 0 to s, preferably between 0 and 0.9 s;
and A, B, R', k, h, n, m and q are as defined above.

It is a particular feature of the process according to the present invention that relatively small quantities of polyisocyanates are used, generally from about 0.2 to 20%, by weight, preferably from 0.5 to 15%, by weight, based on the weight of the polyurethane finally obtained. If, according to a preferred embodiment of the present invention, the process is carried out without chain-lengthening agent, the quantity of polyisocyanate used is only from about 0.5 to 3%, by weight. The equivalent ratio of isocyanate groups to isocyanate-reactive groups in the process according to the present invention is generally from 0.5 to 5, preferably from 0.8 to 3, and most preferably from 0.9 to 1.5.

The quantity of polyisocyanate may be kept very low (so that even a relatively large excess of isocyanate groups over the stoichiometrically calculated number essentially does not influence the properties of the final product) particularly if, according to another preferred feature of the present invention, the compounds which have isocyanate-reactive hydrogen atoms are segmented, high molecular weight polyols corresponding to the following general formula: $D(OH)_s$ or the corresponding products which have been modified with isatoic acid anhydride.

The polyisocyanates used as starting components include essentially any organic isocyanate including aliphatic, cycloaliphatic, araliphatic, aromatic or heterocyclic polyisocyanates, such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane (German Auslegeschrift No. 1,202,785, U.S. Pat. No. 3,401,190); hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyanate; triphenylmethane-4,4',4''-triisocyanate; polyphenylpolymethylene polyisocyanates which may be obtained by aniline formaldehyde condensation followed by phosgenation and which have been described, for example, in British Pat. Nos. 874,430 and 848,671; m and p-isocyanatophenyl-sulphonyl isocyanates as described in U.S. Pat. No. 3,454,606; perchlorinated aryl polyisocyanates, such as those described, for example, in U.S. Pat. No. 3,277,138; polyisocyanates having carbodiimide groups as described in U.S. Pat. No. 3,152,162; diisocyanates of the type described in U.S. Pat. No. 3,492,330; polyisocyanates having allophanate groups as described, e.g. in British Pat. No. 994,890, in Belgian Pat. No. 761,626 and in published Dutch Patent Application No. 7,102,524; polyisocyanates having isocyanurate groups, e.g. as described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates having urethane groups as described, e.g. in Belgian Pat. No. 752,261 or in U.S. Pat. No. 3,394,164; polyisocyanates having acylated urea groups as described in German Pat. No. 1,230,778; polyisocyanates having biuret groups as described, e.g. in U.S. Pat. Nos. 3,124,605 and 3,201,372 and in British Pat. No. 889,050; polyisocyanates prepared by telomerization reactions as described in U.S. Pat. No. 3,654,106; polyisocyanates having ester groups, such as those mentioned in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid groups according to U.S. Pat. No. 3,455,883. The distillation residues obtained from the commercial production of isocyanates and still containing isocyanate groups may also be used, optionally as solutions in one or more of the above-mentioned polyisocyanates. Mixtures of the above-mentioned polyisocyanates may also be used.

As a general rule, it is particularly preferred to use readily available polyisocyanates, such as tolylene-2,4-diisocyanate and -2,6-diisocyanate and mixtures of these isomers, the isomeric diphenylmethane diisocyanates; hexamethylene diisocyanate; and 1,5-naphthylene diisocyanate.

Polyesters which are preferred according to the present invention, in particular polyester diols, are obtained from compounds corresponding to the following general formula:

$$A \text{+} OH)_n$$

having a molecular weight of from about 500 to about 1000, preferably from 750 to 5000; most preferably from 1000 to 2500, and a melting point above 80° C., preferably from 110° to 300° C., most preferably from 150° to 250° C. Such high melting polyesters are generally obtained when either the acid component used for the preparation thereof or the diol component (or portions of both) is of an aromatic or cycloaliphatic nature. Examples of such acids include terephthalic acid, isophathalic acid, naphthylene-1,5 and -2,6-dicarboxylic acid and the corresponding dicarboxylic acids which are chlorinated and/or hydrogenated on the nucleus. Examples of suitable aromatic and cycloaliphatic diols include hydantoins corresponding to the following formula:

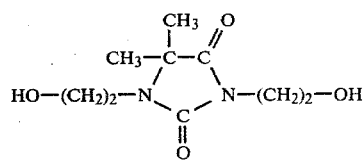

N,N'-bis-hydroxyalkyl-benzimidazolones, e.g. corresponding to the following formula:

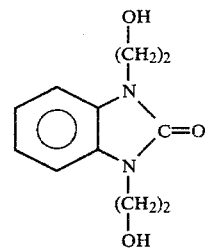

cyclohexane dimethanol, dihydroxymethyl-hydroquinone, 1,4-phenylene-bis-(β-hydroxyethylether) and the isomeric dihydroxycyclohexanes. Apart from these cycloaliphatic and aromatic starting components, the aliphatic polyols and polycarboxylic acids described in more detail below may, of course, also be used for the preparation of the high melting polyesters. Pivalolactonediol, for example, is a suitable high melting polylactone. However, the high melting segments are preferably obtained from polyesters based on terephthalic acid and/or isophthalic acid and ethylene glycol, butane-1,4-diol and/or hexanediol.

The starting components which correspond to the following general formula:

$$B \text{+} XH)_m$$

include polyesters, polyethers, polythioethers, polyacetals, polycarbonates or polyester amides which contain from 2 to 8, preferably 2 to 4, more preferably 2 or 3 and most preferably 2, hydroxyl groups and have a low melting point, such as the polyhydroxyl compounds known for the production of both cellular and non-cellular polyurethanes. These polyhydroxyl compounds have a molecular weight of from about 500 to about 25,000, preferably from 1000 to 10,000, and a melting point below 60° C., preferably below 40° C., most preferably below 30° C.

Suitable polyesters having hydroxyl groups include, e.g. reaction products of polyhydric, preferably dihydric, alcohols, optionally with the addition of trihydric alcohols, and polybasic, preferably dibasic, carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ϵ-caprolactone, or hydroxycarboxylic acids, such as ϵ-hydroxycaproic acid, may also be used.

The polyethers which may be used according to the present invention which have at least two, generally from 2 to 4, preferably 2 or 3, hydroxyl groups are also known and are prepared, for example, by polymerization of epoxides, such as ethylene oxide, propylene oxide, butylene oxide, tetrahydrofuran, styrene oxide or epichlorohydrin, either each on its own, e.g. in the presence of $BF_3$, or by addition of these epoxides, optionally as mixtures or successively, to starting components having reactive hydrogen atoms, such as water, ammonia, alcohols or amines. In addition to water and ammonia, suitable starters include ethylene glycol, propylene glycol-(1,3) or -(1,2), trimethylolpropane, 4,4'-dihydroxydiphenylpropane, aniline, ethanolamine or ethylene diamine. Sucrose polyethers may also be used according to the present invention, e.g. those described in German Auslegeschrift Nos. 1,176,358 and 1,064,938. It is in many cases preferred to use polyethers which contain predominant amounts of primary OH groups (up to about 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Pat. No. 1,152,536) are also suitable, as well as polybutadienes which have OH groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from the reaction of glycols, such as diethylene glycol, triethylene glycol, 4,4'-dioxethoxydiphenyl dimethylmethane and hexanediol, with formaldehyde. Suitable polyacetals for the purposes of the present invention may also be prepared by the polymerization of cyclic acetals.

The polycarbonates having hydroxyl groups which may be used are known, and include for example, those which may be prepared by the reaction of diols, such as propanediol-(1,3), butanediol-(1,4) and/or hexanediol-(1,6), diethylene glycol, triethylene glycol or tetraethylene glycol, with diaryl carbonates, e.g. diphenyl carbonate, or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenol formaldehyde resins or of alkylene oxides and urea formaldehyde resins are also suitable for the purposes of the present invention.

Representatives of the varied compounds which may be used according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, pages 45 to 71.

Mixtures of the above-mentioned compounds may, of course, also be used, for example, mixtures of polyethers and polyesters.

Polyhydroxyl compounds which contain high molecular weight polyadducts or polycondensates in a finely dispersed or dissolved form may also be used according to the present invention. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above-mentioned hydroxyl compounds. Processes of this type have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified polyhydroxyl compounds may also be obtained according to U.S. Pat. No. 3,869,413 or German Offenlegungsschrift 2,550,860 by mixing a previously prepared aqueous polymer dispersion with a polyhydroxyl compound and then removing the water from the mixture. When modified polyhydroxyl compounds of the type described above are used as starting components for the polyisocyanate polyaddition process, polyurethane resins which have substantially improved mechanical properties are obtained in many cases.

The compounds corresponding to the following general formula:

$$B{+}XH)_m$$

used according to the present invention may also include copolyether esters obtained by etherification of a mixture of at least two of the polyethers or polyesters described above. Methods for production of this type of material have been described, for example, in British Pat. No. 1,402,610, U.S. Pat. No. 3,849,515 and U.S. Pat. No. 3,963,800. According to the methods described in these patents, copolyether esters are prepared by heating various polyether polyols and/or polyester polyols to temperatures of from about 150° to 250° C. in the presence of etherification catalysts, such as sulfuric acid, toluene sulfonic acid, chlorosulfonic acid or sulfonic acid chlorides.

According to the present invention, however, the preferred higher molecular weight compounds having isocyanate-reactive hydrogen atoms are those corresponding to the following general formula:

$$D{+}XH)_s$$

which preferably have a molecular weight of from about 4000 to about 20,000, most preferably from 6000 to 15,000, and which are built up statistically of high melting and low melting segments corresponding to the following general formulae:

$$A{+}O)_n$$
and
$$B{+}X)_m$$

which are linked together through ester groups. Block copolymers of this type may be obtained quite simply from the above-described polyols or polythiols corresponding to the following general formulae:

$$A{+}OH)_n$$
and
$$B{+}XH)_m$$

by known methods of solvent-free condensation, for example as described in U.S. Pat. No. 3,963,800, and German Offenlegungsschriften No. 2,412,727 and 2,458,472. In these methods, one may either start with previously prepared polyols $A{+}OH)_n$ and link these with the compounds $B{+}XH)_m$ by an esterification reaction effected by heating in the presence of transesterification catalysts or, according to a preferred variation, particularly if the compound $A{+}OH)_n$ is a polyester polyol based on an aromatic polycarboxylic acid, the compound $A{+}OH)_n$ may be prepared in situ in $B{+}XH)_m$ by a one-pot process in the presence of the conventional transesterification catalysts and then coupled to the compound $B{+}XH)_m$ by transesterification with elimination of low molecular weight polyol effected by heating. It is surprisingly found that in this process, $B{+}XH)_m$ is broken down only to an insignificant extent, even if it contains ester groups, so that the end product is composed of segments of $A{+}O)_n$ and segments of $B{+}X)_m$ as desired. Preferably, terephthalic acid dialkyl esters and/or isophthalic acid dialkyl esters in which the alkyl groups contain from 1 to 4 carbon atoms (preferably the dimethyl esters) are reacted with low molecular weight glycols having from 2 to 15, preferably from 2 to 6, carbon atoms in the solvent-free molten compound $B{+}XH)_m$ in the presence of transesterification catalysts, initially at normal pressure and thereafter at reduced pressure and with gradual heating to from about 200° to 250° C., preferably from 220° to 240° C. However, in contrast to the process described in the above-mentioned patents, in which high molecular weight, elastomeric segment polyesters are prepared, the process of solvent-free condensation carried out according to the present invention is stopped at a stage when the products of the process still have a comparatively low molecular weight (preferably from about 4000 to about 20,000). Within this molecular weight range, the products are still waxy to brittle and have no marked elastomer properties. It is only after the reaction according to the present invention with small quantities of polyisocyanates that elastomers having valuable properties are obtained. Some of these elastomers may be melted reversibly and they are also suitable for thermoplastic processing. One advantage of the process according to the present invention compared with that described in the above-mentioned patents is that the commercially expensive processes of condensation to produce elastic, high molecular weight, segmented copolyether esters is replaced by the much simpler reaction with polyisocyanates. Another advantage is that the products obtained by the process vary more widely and have better properties.

Exceptionally advantageous effects are generally obtained by the process according to the present invention if the compounds corresponding to the following general formulae:

$$A{+}OH)_n$$
and
$$B{+}XH)_m$$

used for preparing the segmented copolyester polyols or copolyether ester polyols are incompatible with each other, i.e. not miscible with each other.

Another process for the preparation of the preferred block copolymers used according to the present invention, which correspond to the following general formula:

$$D{+}XH)_s$$

apart from solvent-free condensation is the alkoxylation of high melting polyols corresponding to the following general formula:

$$A{+}OH)_{n'}$$

preferably polybutylene terephthalate. However, this process is less preferred according to the present invention.

In another embodiment of the process according to the present invention, the higher molecular weight compounds having isocyanate-reactive groups used as starting materials may be those obtained by the modification of compounds corresponding to the following general formulae:

$$A \text{+} (OH)_n$$

and $$B \text{+} (XH)_m$$

or $$D \text{+} (XH)_s$$

with equivalent or less than equivalent quantities of isatoic acid anhydride. Modification reactions of this type have been described in U.S. Pat. No. 3,808,250, U.S. Pat. No. 3,975,428 and German Offenlegungsschrift No. 2,619,840. To obtain such modified products, the polyols or polythiols are reacted with from 5 to 100%, preferably from 5 to 90%, most preferably from 10 to 70%, of the equivalent quantity of isatoic acid anhydride (based on the total quantity of hydroxyl and-/or mercapto groups), optionally in the presence of basic organic and/or inorganic catalysts at temperatures of from 0° to 200° C., preferably from 20° to 130° C. Inert solvents may be used if desired.

According to a less preferred embodiment of the present invention, the preparation of polyurethane elastomers may be carried out in the presence of low molecular weight chain-lengthening agents in addition to the modified or unmodified higher molecular weight polyols or polythiols which have been described in detail above. The following are examples of such compounds: ethylene glycol, propylene glycol-(1,2), and -(1,3), butylene glycol-(1,4) and -(2,3), pentanediol-(1,5), hexanediol-(1,6), octanediol-(1,8), neopentylglycol, 1,4-bis-(hydroxymethyl)-cyclohexane, 2-methyl-1,3-propanediol, glycerol, trimethylolpropane, hexanetriol-(1,2,6), trimethylolethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight up to 400, dibutylene glycol, polybutylene glycols having a molecular weight of up to 400, 4,4'-dihydroxydiphenylpropane, bis-(hydroxymethyl)-hydroquinone, ethanolamine, diethanolamine, triethanolamine, 3-aminopropanol, ethylenediamine, 1,3-diaminopropane, 1-mercapto-3-aminopropane, 4-hydroxyphthalic acid or 4-aminophthalic acid, succinic acid, adipic acid, hydrazine, N,N'-dimethylhydrazine, 4,4'-diaminodiphenylmethane, tolylenediamine, methylene-bis-chloroaniline, methylene-bis-anthranilic acid esters, diaminobenzoic acid esters and the isomeric chlorophenylene diamines. Mixtures of different compounds having at least two isocyanate-reactive hydrogen atoms and a molecular weight of from 32 to 400 may also be used in this case.

If diamines are used as chain extending agents, the urea groups formed by reaction with NCO-groups act as additional "hard segments" in the elastomer. In such a case the proportion of the high melting segments (a) in the elastomers according to the invention may be reduced somewhat (about 10%) below the limit of 40% without substantially affecting the properties of the polyurethane.

The process according to the present invention may be carried out as follows: According to a particularly preferred embodiment of the process, the block copolymer corresponding to the following general formula:

$$D \text{+} (XH)_s$$

which is composed of high melting and low melting segments is reacted solvent-free with a quantity of polyisocyanate such that the equivalent ratio of isocyanate groups to isocyanate-reactive groups is from 0.5 to 5, preferably from 0.8 to 3, this reaction being optionally carried out after modification with isatoic acid anhydride. Chain-lengthening agents may be dissolved in the block copolymer, preferably aromatic diamines of the type which have a low reactivity towards isocyanate groups.

If the high melting polyol corresponding to the following general formula:

$$A \text{+} (OH)_n$$

is soluble or dispersible in the low melting compound corresponding to the following general formula:

$$B \text{+} (XH)_m$$

the process according to the present invention may be carried out by reacting a mixture of these two compounds (with the optional addition of chain-lengthening agents) with the polyisocyanate in the proportions indicated above. According to another possible embodiment, an isocyanate group-containing prepolymer based on a compound corresponding to the following general formula:

$$B \text{+} (XH)_m$$

is reacted with a very finely ground high melting polyol corresponding to the following general formula:

$$A \text{+} (OH)_n$$

made up into a paste with a suitable carrier, for example a heavy oil, liquid polyester or polyether polyols, phthalic acid esters or other commonly used plasticizers.

According to another particularly preferred embodiment of the process according to the present invention, an isocyanate prepolymer (preferably preheated to temperatures of from ca. 80° to 180° C., in particular from 100° C. to 140° C.) which has been obtained from the compound corresponding to the following general formula:

$$B \text{+} (XH)_m$$

and an excess of polyisocyanate, and which has optionally been freed from monomeric isocyanate by thin layer distillation, is mixed with the molten polyol corresponding to the following general formula:

$$A \text{+} (OH)_n$$

and the mixture is reacted, optionally in the presence of one of the catalysts described below. In this embodiment of the process, monomeric diisocyanates, low molecular weight chain-lengthening agents, blowing agents and other known additives of the type described below may also be included, if desired.

When this embodiment of the process is employed, the polyols corresponding to the following general formula:

$$A \text{+} (OH)_n$$

used as "hard segment formers" are preferably polyols having a melting point of from 80° to 300° C. in particular from 110° to 230°0 C. The isocyanate index (NCO-/OH+NH$_2$)×100 is preferably in the region of from 90 to 130, in particular from 95 to 100.

The elastomers prepared by this embodiment of the process, which is preferred according to the present invention, should contain the segments corresponding to the following general formulae:

$$A+O)_n$$

and $$B+X)_m$$

in a ratio, by weight, of from 40:60 to 80:15, preferably from 45:55 to 80:20.

According to the present invention, water and/or readily volatile organic subtances may be used as blowing agents. Suitable organic blowing agents include, for example, acetone, ethyl acetate and halogen-substituted alkanes, such as methylene chloride, chloroform, ethylidene chloride, vinylidene chloride, monofluorotrichloromethane, chlorodifluoromethane and dichlorodifluoromethane, as well as butane, hexane, heptane and diethyl ether. The effect of a blowing agent may also be obtained by the addition of compounds which decompose at temperatures above room temperature to release gases, such as nitrogen e.g. azo compounds, such as azoisobutyric acid nitrile. Further examples of blowing agents and the use of blowing agents have been described in Kunststoff-Handbuch, Volume VII, published by Vieweg and Höchtlen, Carl-Hanser-Verlag, Munich 1966, pages 108 and 109, 453 to 455 and 507 to 510.

Catalysts are also frequently used according to the present invention. The catalysts added may be known compounds, for example, tertiary amines, such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole and 2-methylimidazole. Known Mannich bases obtained from secondary amines, such as dimethylamine, and aldehydes, preferably formaldehyde, or ketones, such as acetone, methyl ethyl ketone or cyclohexanone, and phenols, such as phenol, nonylphenol or bis-phenol, may also be used as catalysts.

Examples of tertiary amines having isocyanate-reactive hydrogen atoms used as catalysts include: triethanolamine, triisopropanolamine, N-methyl-diethanolamine, N-ethyl-diethanolamine, N,N-dimethylethanolamine and the reaction products thereof with alkylene oxides, such as propylene oxide and/or ethylene oxide.

Silaamines having carbon-silicon bonds as described in U.S. Pat. No. 3,620,984 and may also be used as catalysts, e.g. 2,2,4-trimethyl-2-silamorpholine or 1,3-diethyl-aminomethyl-tetramethyl-disiloxane.

Basic nitrogen compounds, such as tetraalkylammonium hydroxides, alkali metal hydroxides, such as sodium hydroxide, alkali metal phenolates, such as sodium phenolate, and alkali metal alcoholates, such as sodium methylate, may also be used as catalysts. Hexahydrotriazines are also suitable catalysts.

Organo metallic compounds may also be used as catalysts according to the present invention, in particular organo tin compounds.

The organo tin compounds used are preferably tin(II) salts of carboxylic acids, such as tin(II) acetate, tin(II) octoate, tin(II) ethyl hexoate and tin(II) laurate, and tin(IV) compounds, such as dibutyl tin oxide, dibutyl tin dichloride, dibutyl tin diacetate, dibutyl tin dilaurate, dibutyl tin maleate or dioctyl tin diacetate. The above-mentioned catalysts may, of course, be used as mixtures.

Further examples of catalysts which may be used according to the present invention and details concerning the activity of the catalysts are given in Kunststoff-Handbuch, Volume VII, published by Vieweg and Höchtlen, Carl-Hanser-Verlag, Munich 1966, e.g. on pages 96 to 102.

The catalysts are generally used in a quantity of from about 0.001 to 10%, by weight, based on the quantity of active hydrogen containing material.

Surface active additives, such as emulsifiers and foam stabilizers, may also be used according to the present invention. Suitable emulsifiers include, e.g. the sodium salts of ricinoleic sulfonate or salts of fatty acids with amines, such as oleic acid diethylamine or stearic acid diethanolamine. Alkali metal or ammonium salts of sulfonic acids, such as dodecylbenzenesulfonic acid or dinaphthylmethane disulfonic acid, or of fatty acids, such as ricinoleic acid, or of polymeric fatty acids may also be used as surface active additives.

Suitable foam stabilizers are particularly the polyether siloxanes and especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748; 2,917,480 and 3,629,308.

Other additives may also be used such as reaction retarders, substances which are acid in reaction, such as hydrochloric acid or organic acid halides; known cell regulators, such as paraffins or fatty alcohols or dimethyl polysiloxanes; pigments; dyes; known flame retarding agents, such as tris-chloroethylphosphate, tricresylphosphate or ammonium phosphate and polyphosphate; stabilizers against aging and weathering; plasticizers; fungistatic and bacteriostatic substances; and fillers, such as barium sulfate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning the use and mode of action of these additives may be found in Kunststoff-Handbuch, Volume VII, published by Vieweg and Höchtlen, Carl-Hanser-Verlag, Munich 1966, on pages 103 to 113.

The components may be reacted together by the known one-shot process, prepolymer process or semi-prepolymer process, often using mechanical devices, such as those described in U.S. Pat. No. 2,764,565. Details concerning processing apparatus which may also be used may be found in Kunststoff-Handbuch, Volume VII, published by Vieweg and Höchtlen, Carl-Hanser-Verlag, Munich 1966, e.g. on pages 121 to 205.

The foaming reaction for producing foam products is often carried out inside molds. In such a process, the foamable reaction mixture is introduced into a mold which may be made of a metal, such as aluminum, or a plastics material, such as an epoxide resin, and it foams inside the mold to produce the shaped product. This process of foaming in molds may be carried out to produce a product having a cellular structure on its surface or it may be carried out to produce a product having a compact skin and cellular core. According to the present invention, the desired result may be obtained by either introducing just sufficient foamable reaction mixture to fill the mold with foam after the reaction or introducing a larger quantity of reaction mixture than is necessary to fill the mold with foam. The second method is known as "overcharging", a procedure which has been described in U.S. Pat. Nos. 3,178,490 and 3,182,184.

Known so-called "external mold release agents", such as silicone oils, are frequently used when foaming is carried out inside molds. The process may also be carried out with the aid of so-called "internal mold release agents", if desired, in combination with external mold release agents as disclosed in German Offenlegungsschrift Nos. 2,121,670 and 2,307,589.

Cold setting foams may also be produced according to the present invention (see British Pat. No. 1,162,517 and German Offenlegungsschrift No. 2,153,086).

Foams may, of course, also be produced by the process of block foaming or by the known laminating process.

The following examples illustrate the process according to the present invention.

EXAMPLE 1

(a) Preparation of a segmented copolyester polyol

A mixture of 1746 g (9 mol) of dimethylterephthalate, 1620 g (18 mol) of butane-1,4-diol and 1392 g of a polyester [of adipic acid and diethylene glycol originally having a molecular weight of 2100 and being liquid at room temperature, which polyester has been etherified with itself by means of catalytic amounts of chlorosulfonic acid to a polyether ester having an average molecular weight of 20,000 by the process according to German Offenlegungsschrift No. 2,360,287] is heated to a temperature of from 150° to 180° C. for 10 hours with stirring. Elimination of a total of 532 g of methanol begins at 145° C., catalyzed by 0.5 ml of tetrabutyl titanate. The remainder of the methanol is distilled off at 15 Torr and a reaction temperature of 150° C. After 5 hours at 15 Torr and from 150° to 180° C., 360 g of butane-1,4-diol have been distilled off and the OH number is 137. After a further 3 hours at 180° C. and 0.2 Torr, an additional 207 g of butane-1,4-diol have been removed and the OH number is 71. An additional 81 g of butane-1,4-diol are removed in the course of an additional 3 hours at 0.1 Torr and a temperature of from 190° to 200° C. Thereafter, 40 g of butanediol are distilled off at 210° C./0.1 Torr in the course of 2 hours (OH number 37.6) and condensation is then completed in the course of an additional 2 hours at from 225° to 235° C./0.1 Torr. The total quantity of butanediol distilled off is 743 g. The yield of segmented copolyester containing ether groups is 3240 g. The softening point of the copolyester is 128° C. and the OH number 21.8 (average molecular weight: 5150). The melting point of the polybutylene glycol terephthalate segments is about 210° C.

(b) Process according to the present invention 6 g of a commercial oxidation stabilizer (Nauguard ® of Naugatuc, U.S.A.) based on the reaction product of 1 mol of diphenylamine and 2 mols of α-methylstyrene are added to 300 g of the segmented copolyester diol and the mixture is degasified in a water jet vacuum with stirring at 165° C. The copolyester is then mixed by stirring with 11 g of naphthylene-1,5-diisocyanate and the reaction mixture is poured into a mold which has been heated to 160° C. A reversibly thermoplastic elastomer having the following properties is obtained after cooling:

| δ 100 | [MPa] | DIN | 53504 | 7.45 |
|---|---|---|---|---|
| δ 300 | " | | " | 8.75 |
| Tensile strength | " | | " | 18.6 |
| Elongation on tearing | [%] | | " | 730 |
| Structural stability | [N] | | " | 410 |
| Shore hardness D | | | 53505 | 39 |
| Elasticity | [%] | | 53512 | 38 |

EXAMPLE 2

(a) Preparation of a copolyester diol containing ether groups

The procedure is the same as described in Example 1(a), but using 540 g (6 mol) of butane-1,4-diol, 582 g (3 mol) of dimethylterephthalate, 464 g of the etherified adipic acid/diethylene glycol polyester having an average molecular weight of 20,000 and 0.3 ml. of tetrabutyl titanate and the reaction mixture is condensed until a total of 301 g of distillate is obtained. A segmented copolyester diol containing ether groups and having an OH number of 8.2 is obtained. Although this copolyester diol is not yet resistant to breakage, it already manifests elastic properties. Its softening point is 132° C. and its average molecular weight is 13,700. The material was stabilized against oxidative aging using 2%, by weight, of a commercial stabilizer (Nauguard ®) and against hydrolytic aging using 1%, by weight, of a commercial aromatic carbodiimide (Stabaxol PCD ®).

(b) Process according to the present invention 3.3 g of naphthylene-1,5-diisocyanate are added to 300 g of the segmented copolyester diol and the mixture is homogenized at from 160° to 170° C. for one minute. The reaction mixture is then poured into a mold and heated for an additional 3 hours at 160° C. An elastomer having the following properties is obtained after cooling:

| δ 100 | [MPa] | 7.9 |
|---|---|---|
| δ 300 | " | 9.4 |
| Tensile strength | " | 17.9 |
| Elongation on tearing | [%] | 720 |
| Structural stability | [N] | 500 |
| Shore hardness A | | 92 |
| Elasticity | [%] | 44 |

When 4 g of 4,4'-diisocyanatodiphenylmethane are used instead of naphthylene diisocyanate, the elastomer obtained has the following properties:

| δ 100 | [MPa] | 8.2 |
|---|---|---|
| δ 300 | " | 9.7 |
| Tensile strength | " | 15.3 |
| Elongation on tearing | [%] | 700 |
| Structural stability | [N] | 510 |
| Shore hardness A | | 92 |
| Elasticity | [%] | 44 |

EXAMPLE 3

(a) Preparation of a segmented copolyester ether polyol

A high molecular weight polyether polyester of OH number 9.5 (melting point about 40° C.) is first prepared from a linear polypropylene glycol (molecular weight 2000) and polybutylene adipate (molecular weight 2250) in a molar ratio of 1:1 by etherification (6 hours at 220° C. in the presence of 0.1 ml of chlorosulfonic acid to 1300 g of polyols as etherification catalyst).

541 g of this polyether polyester, 630 g (7 mol) of butane-1,4-diol, 679 g (3.5 mol) of dimethyl terephthalate and 0.3 ml of tetrabutyltitanate are condensed in the presence of 11.6 g of a commercial oxidation stabilizer (Nauguard ®) the general method described in Example 2(a). A total quantity of 254 g of butanediol is split off. 1400 g of a hard, brittle, segmented copolyester polyether polyol having an average molecular weight of 9300 (OH number 12) and a softening point of 172° C. are obtained. It contains 67% of polybutylene terephthalate segments.

(b) Process according to the present invention 170 g of the segmented copolyester ether polyol are melted under a nitrogen atmosphere at 180° C. and 3.8 g of 1,5-naphthylene diisocyanate are added thereto. The reaction mixture is poured into a hinged follower mold which has been preheated to 180° C. and heating is continued at this temperature for 2 hours. An elastomer having the following properties is obtained:

| δ 100 | [MPa] | 10.0 |
|---|---|---|
| δ 300 | " | 12.2 |
| Tensile strength | " | 17.2 |
| Elongation on tearing | [%] | 580 |
| Structural stability | [N] | 470 |
| Shore hardness A | | 95 |
| Elasticity | [%] | 44 |

EXAMPLE 4

(a) Preparation of a segmented copolyester polyether polyol

A mixture of 582 g (3 mol) of dimethylterephthalate, 540 g (6 mol) of butane-1,4-diol and 945 g of polytetrahydrofurandiol having an average molecular weight of 1000 (melting point about 20° C.) is heated in the presence of 0.3 ml of tetrabutyltitanate in a stirrer apparatus equipped with an internal thermometer. Elimination of methanol sets in at 150° C. and is completed after 8 hours at 180° C. The total quantity of methanol isolated is 176 g. Condensation is then continued for 6 hours at from 150° to 180° C./15 Torr, during which time 249 g butanediol are split off. An additional 79 g of butane-1,4-diol are split off in the course of an additional 2 hours at 200° C./15 Torr followed by distillation at 200° C./0.2 Torr. At the end of this time, the OH number of the product is 28. An additional 15 g of butanediol are split off after 1.5 hours more at from 210° to 220° C./0.25 Torr, the OH number of the segmented copolyester polyether diol being then 18.3 (softening point 164° C.)

(b) Process according to the present invention 301 of the degasified segmented copolyester polyether are stirred with 10.5 g of naphthylene-1,5-diisocyanate at 200° C. and the mixture is poured into a preheated mold. In this mold, it is heated for an additional 3 hours at 200° C. and then cooled. An elastomer having the following properties is obtained:

| δ 100 | [MPa] | 5.6 |
|---|---|---|
| δ 300 | " | 7.6 |
| Tensile strength | " | 21.1 |
| Elongation on tearing | [%] | 820 |
| Structural stability | [N] | 340 |
| Shore hardness A | | 88 |
| Elasticity | [%] | 62 |

An elastomer having similar properties is obtained if the reaction mixture is reacted in the presence of 0.15 g of Sn-II-octoate as catalyst and not reheated.

EXAMPLE 5

119.8 g of the copolyester polyether from Example 4(a), 80.1 g of a linear polypropylene glycol (molecular weight 1000; liquid at room temperature) and 24.2 g of 4-chloro-3,5-diamino-benzoic acid isobutyl ester are intimately stirred together at 150° C. and degasified in a water jet vacuum. 36.5 g of tolylene-2,4-diisocyanate are then added to the mixture within a few seconds and the reaction mixture is then poured into a mold. It is heated in the mold at 110° C. for 24 hours. An elastomer having the following properties is obtained:

| δ 100 | [MPa] | 8.4 |
|---|---|---|
| δ 300 | " | 11.2 |
| Tensile strength | " | 15.2 |
| Elongation at break | [%] | 330 |
| Structural stability | [N] | 360 |
| Shore hardness A | | 37 |
| Elasticity | [%] | 35 |

EXAMPLE 6

The procedure is the same as described in Example 5, but using, as isocyanate component, a prepolymer of 138.5 g of a polyester of hexane-1,6-diol, neopentyl glycol and adipic acid (average molecular weight 1700; melting point 40° C.) and 36.5 g of tolylene-2,4-diisocyanate. The elastomer obtained after 4 hours' heating at 120° C. has the following properties:

| δ 100 | [MPa] | 4.3 |
|---|---|---|
| δ 300 | " | 7.8 |
| Tensile strength | " | 25.2 |
| Elongation at | | |

| | | |
|---|---|---|
| break | [%] | 500 |
| Structural stability | [N] | 360 |
| Shore hardness A | | 84 |
| Elasticity | [%] | 38 |

EXAMPLE 7

173.4 g of the segmented copolyester ether polyol from Example 3(b) are melted at 180° C. with 12.5 g of a polypropylene glycol having the OH number 112 under nitrogen atmosphere, mixed with 7.9 g of naphthylene-1,5-diisocyanate and poured into a mold. An elastomer having the following properties is obtained:

| | | |
|---|---|---|
| δ 100 | [MPa] | 8.9 |
| δ 300 | " | 11.0 |
| Tensile strength | " | 16.9 |
| Elongation at break | [%] | 670 |
| Structural stability | [N] | 460 |
| Shore hardness A | | 94 |
| Elasticity | [%] | 48 |

EXAMPLE 8

165.7 g of a segmented copolyester polyether prepared by a method analogous to that of Example 4(a) from polytetrahydrofuran (average molecular weight: 1000) and polybutylene terephthalate (OH number 17, softening point 180° C., polybutylene terephthalate content 55%, by weight) are melted under nitrogen at 200° C. together with 16.6 g of a polypropylene glycol of OH number 112 (liquid at room temperature) and 10.5 g of molten 4,4'-diisocyanatodiphenylmethane are added at this temperature. The mixture is left to cool in a hinged mold and the product then removed from the mold is an elastomer having the following properties:

| | | | |
|---|---|---|---|
| δ 100 | [MPa] | 8.0 | (annular |
| δ 300 | " | 10.3 | test sample) |
| Tensile strength | " | 21.6 | |
| Elongation at break | [%] | 760 | |
| Structural stability | [N] | 410 | |
| Shore hardness A | | 90 | |
| Elasticity | [%] | 65 | |

EXAMPLE 9

134.1 g of a segmented copolyester polyether prepared by a method analogous to that of Example 4(a) from polytetrahydrofuran (average molecular weight: 1000) and polybutylene terephthalate (OH number 16.5, softening point 202° C., polybutylene terephthalate content approximately 70%, by weight) are melted under nitrogen at 210° C. together with 53.6 g of polytetrahydrofuran (average molecular weight 1000) and, after brief degasification in a water jet vacuum, 15.5 g of naphthylene-1,5-diisocyanate are added. When the procedure is then continued as described in Example 8, an elastomer having the following properties is obtained:

| | | |
|---|---|---|
| δ 100 | [MPa] | 7.3 |
| δ 300 | " | 9.2 |
| Tensile strength | " | 20.0 |
| Elongation at break | [%] | 700 |
| Structural stability | [N] | 410 |
| Shore hardness A | | 92 |
| Elasticity | [%] | 57 |

EXAMPLE 10

172.8 g of a segmented copolyester polyether prepared by a method analogous to that of Example 4(a) from a linear polypropylene glycol (average molecular weight 1000) and polybutylene terephthalate (OH number of copolyether=16; softening point 174° C., polybutylene terephthalate content 55%, by weight) are reacted with 6.3 g of 4,4'-diisocyanato diphenylmethane as described in Example 9. An elastomer having the following properties is obtained:

| | | |
|---|---|---|
| δ 100 | [MPa] | 5.3 |
| δ 300 | " | 7.6 |
| Tensile strength | " | 13.1 |
| Elongation at break | [%] | 770 |
| Structural stability | [N] | 330 |
| Shore hardness A | | 88 |
| Elasticity | [%] | 59 |

EXAMPLE 11

93.7 g of the segmented copolyester polyether from Example 4 and 70.5 g of a segmented copolyester diol containing ether groups, which has been prepared by a method analogous to that of Example 4(a) (OH number 19, softening point 159° C., polybutylene terephthalate content 80%, by weight) are reacted with 5.0 g of naphthylene-1,5-diisocyanate as described in Example 9. An elastomer having the following properties is obtained:

| | | |
|---|---|---|
| δ 100 | [MPa] | 9.2 |
| δ 300 | " | 11.6 |
| Tensile strength | " | 24.8 |
| Elongation at break | [%] | 725 |
| Structural stability | [N] | 510 |
| Shore hardness A/D | | 94/46 |
| Elasticity | [%] | 57 |

EXAMPLE 12

149 g of a segmented copolyester ether (softening point 72° C., OH number 30, polybutylene terephthalate content 40%, by weight) which has been prepared from a linear polypropylene glycol (molecular weight 1000) by a method analogous to that of Example 4(a) are melted under nitrogen together with 29.8 g of a pure polybutylene terephthalate having an OH number 60 (melting point 216° C.) and reacted with 14 g of 4,4'-diisocyanatodiphenylmethane. An elastomer having the following properties is obtained.

| | | |
|---|---|---|
| δ 100 | [MPa] | 4.4 |
| δ 300 | " | 7.0 |
| Tensile strength | " | 10.2 |
| Elongation at break | [%] | 600 |
| Structural stability | [N] | 300 |
| Shore hardness A | | 84 |
| Elasticity | [%] | 49 |

EXAMPLE 13

80 g of a polybutylene terephthalate diol having the OH number 89 (melting point: 206° C.) are melted under nitrogen at 200° C. together with 80 g of a polyester of adipic acid and butanediol (molecular weight 2250; melting point about 55° C.) and the melt obtained is degasified in a water jet vacuum. After the addition of 25 g of 4,4'-diisocyanatodiphenyl methane, the mixture is poured into a mold and left to cool in it. An elastomer having the following properties is obtained:

| | | |
|---|---|---|
| δ 100 | [MPa] | 6.8 |
| δ 300 | " | 7.8 |
| Tensile strength | " | 9.3 |
| Elongation at break | [%] | 300 |
| Structural stability | [N] | 320 |
| Shore hardness A/D | | 93/37 |
| Elasticity | [%] | 33 |

EXAMPLE 14

The procedure is the same as described in Example 12, but using 1 mol of a segmented copolyester ether prepared analogously to Example 4(a) which has an OH number of 19 and a softening point of 97° C. and a polybutylene terephthalate content of 40%, by weight, (80 mol % terephthalic acid, 20 mol % isophthalic acid), 1 mol of polybutylene terephthalate diol (OH number 60, melting point 216° C.) and 2 mol of 4,4'-diisocyanato-diphenylmethane. An elastomer having the following properties is obtained:

| | | |
|---|---|---|
| δ 100 | [MPa] | 5.6 |
| δ 360 | " | 8.2 |
| Tensile strength | " | 12.6 |
| Elongation at break | [%] | 620 |
| Structural stability | [N] | 392 |
| Shore hardness A | | 89 |
| Elasticity | [%] | 64 |

EXAMPLE 15

The copolyester polyether prepared according to Example 3(a) is first reacted with a stoichiometric quantity of isatoic acid anhydride according to the general method described in U.S. Pat. No. 3,808,250.

150 g of this segmented copolyester polyether which has anthranilic acid ester end groups (softening point 178° C.) and melted under nitrogen and 4.6 g of molten naphthylene-1,5-diisocyanate are added. The mixture is poured into a mold which has been preheated to 150° C. It is heated in this mold for 2 hours, cooled and removed. An elastomer having the following properties is obtained:

| | | |
|---|---|---|
| δ 100 | [MPa] | 10.0 |
| δ 300 | " | 12.1 |
| Tensile strength | " | 17.2 |
| Elongation at break | [%] | 600 |
| Structural stability | [N] | 470 |
| Shore hardness A | | 96 |
| Elasticity | [%] | 46 |

EXAMPLE 16

53 g [0.03 mol] of a prepolymer obtained from a polyether of 87% propylene oxide and 13% ethylene oxide, which polyether was started on propylene glycol and contains mainly primary hydroxyl groups in the end positions and has an average molecular weight of 1500 (liquid at room temperature) and tolylene diisocyanate (80% 2,4-isomer) are heated to 130° C. and degasified by application of a water jet vacuum. 109 g [0.03 mol] of a melted polyhexamethylene terephthalate diol (OH number: 30.5; softening point: 143° C.) are added and the mixture is immediately poured into a hinged mould which has bee preheated to 130° C. After 5 hours' heating at this temperature, the product is left to cool and an elastomer having the following properties is obtained

| | | | |
|---|---|---|---|
| δ 100 | (DIN 53 504) | 6.54 | MPa |
| δ 300 | (DIN 53 504) | 8.53 | MPa |
| Tensile strength | (DIN 53 504) | 15.2 | MPa |
| Elongation on tearing | (DIN 53 504) | 460 | % |
| Structural stability | (DIN 53 504) | 332 | N |
| Shore hardness A/D | (DIN 53 505) | 94/44 | |
| Elasticity | (DIN 53 512) | 33 | |

EXAMPLE 17

The procedure is the same as described in Example 16, but using 40.4 g (0.03 mol) of a prepolymer based on a polytetrahydrofurane diol (Polymeg ® of Quaker Oats) having an average molecular weight of 1000 (melting point ca. 20° C.) and tolylene diisocyanate (80% 2,4-isomer, 20% 2,6-isomer). The following duromer is obtained:

| | | |
|---|---|---|
| δ 100 | 9.43 | MPa |
| δ 300 | 10.1 | MPa |
| Tensile strength | 17 | MPa |
| Elongation on tearing | 513 | % |
| Structural stability | 608 | N |
| Shore hardness A/D | 96/54 | |
| Elasticity | 34 | % |

EXAMPLE 18

71.7 g (0.04 mol) of the prepolymer according to Example 16 are reacted at 130° C. with 70.2 g (0.04 mol) of a melted polyalkylene terephthalate diol (OH number 63.3) having a softening point of 124° C. The polyalkylene terephthalate was prepared from a mixture of 25% of butane-1,4-diol and 75% of hexane-1,6-diol.

An elastomer having the following properties is obtained:

| | | |
|---|---|---|
| δ 100 | 4.53 | MPa |
| δ 300 | 6.1 | MPa |
| Tensile strength | 16.0 | MPa |

| -continued | | |
|---|---|---|
| Elongation on tearing | 700 | % |
| Structural stability | 210 | N |
| Shore hardness A/D | 90/36 | |
| Elasticity | 37 | % |

EXAMPLE 19

60.6 g (0.045 mol) of the prepolymer according to Example 17 are reacted at 130° C. with 82.3 g (0.043 mol) of a polyalkylene terephthalate diol having an OH number of 61, prepared from a mixture of 75% of hexane-1,6-diol and 25% ethylene glycol and having a softening point of 133° C. The procedure is otherwise the same as described in Example 16 and the following elastomer is obtained:

| $\delta$ 100 | 6.10 | MPa |
|---|---|---|
| $\delta$ 300 | 8.52 | MPa |
| Tensile strength | 13.4 | MPa |
| Elongation on tearing | 416 | % |
| Structural stability | 335 | N |
| Shore hardness A/D | 87/45 | |
| Elasticity | 36 | % |

EXAMPLE 20

60.6 g (0.045 mol) of the prepolymer from Example 17 are reacted as described in Example 16 with 79.0 g of the melted polyalkylene terephthalate diol described in Example 18. The following elastomer is obtained:

| $\delta$ 100 | 4.40 | |
|---|---|---|
| $\delta$ 300 | 6.83 | |
| Tensile strength | 14.2 | |
| Elongation at break | 515 | |
| Structural stability | 210 | |
| Shore hardness A/D | 86/37 | |
| Elasticity | 48 | |

EXAMPLE 21

29.6 g (0.022 mol) of a prepolymer which has been prepared from a polypropylene glycol (average molecular weight 1,000, liquid at room temperature) and tolylene diisocyanate (80% 2,4-isomer) using an NCO/OH ratio of 2:1 are preheated to 130° C. and reacted with 126 g (0.022 mol) of a polyhexamethylene terephthalate diol having an OH number of 19.3 and a softening point of 147° C., the reaction being carried out in the presence of 100 mg of Sn-(II) octoate. The following duromer is obtained after the heat treatment described in Example 16:

| Tensile strength | 13 | MPa |
|---|---|---|
| Elongation at break | 60 | % |
| Structural stability | 760 | N |
| Shore hardness A/D | 97/57 | |
| Elasticity | 30 | |

EXAMPLE 22

The procedure is the same as described in Example 16, but using 76.5 g (0.03 mol) of a prepolymer based on a polypropylene glycol which has been grafted to an extent of 20%, by weight, with styrene/acrylonitrile (40:60) and has an average molecular weight of 2000 (liquid at room temperature) and tolylene diisocyanate (NCO/OH ratio=2).

An elastomer having the following propertis is obtained:

| $\delta$ 100 | 7.2 | MPa |
|---|---|---|
| $\delta$ 300 | 9.7 | MPa |
| Tensile strength | 18.2 | MPa |
| Elongation on break | 440 | % |
| Structural stability | 380 | N |
| Shore hardness A/D | 93/42 | |
| Elasticity | 37 | |

EXAMPLE 23

The procedure is the same as that described in Example 16, but instead of tolylene diisocyanate, the equivalent quantity of 4,4'-diisocyanato-diphenylmethane is used. An elastomer having the following properties is obtained:

| $\delta$ 100 | 8.3 | MPa |
|---|---|---|
| $\delta$ 300 | 12.0 | MPa |
| Tensile strength | 19.4 | MPa |
| Elongation on tearing | 480 | % |
| Structural stability | 362 | N |
| Shore hardness A/D | 95/47 | |
| Elasticity | 40 | |

EXAMPLE 24

The procedure is the same as described in Example 16, but instead of tolylene diisocyanate, the equivalent quantity of hexamethylene-1,6-diisocyanate is used. The prepolymer used has been purified by thin layer distillation and the reaction is catalysed with 200 mg of Sn-(II) octoate. An elastomer having the following properties is obtained after 24 hours' heat treatment:

| Tensile strength | 13.6 | MPa |
|---|---|---|
| Elongation on tearing | 585 | % |
| Structural stability | 280 | N |
| Shore hardness A | 86 | |
| Elasticity | 46 | |

Similar results are obtained when isophorone diisocyanate is used.

What is claimed is:

1. A process for said preparation of polyurethane resin, which may be cellular, comprising: reacting polyisocyanates, high molecular weight compounds having at least two isocyanate-reactive hydrogen atoms and a molecular weight of from about 500 to about 25,000 and, optionally, low molecular weight chain-lengthening agents, optionally in the presence of catalysts, blowing agents and other known additives wherein the higher molecular weight compounds having isocyanate-reactive hydrogen atoms used comprise: a mixture of (a) from about 40 to about 85% by weight based on the total weight of (a)+(b), of compounds corresponding to the following general formula:

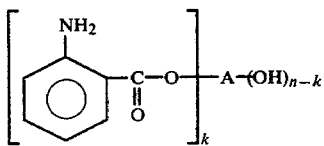

and (b) from about 15 to about 60%, by weight, based on the total weight of (a) and (b), of compounds corresponding to the following general formula:

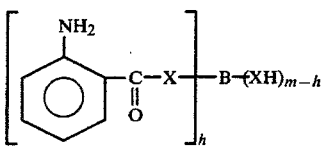

wherein

X represents oxygen or sulfur;

A represents a k-valent residue obtained by the removal of k hydroxyl groups from a polyol having n hydroxyl groups, an average molecular weight of from about 500 to about 5000 and a melting point higher than 130° C.;

B represents an h-valent residue obtained by the removal of h hydroxyl groups and/or mercapto groups from a polyol or polythiol having m hydroxyl and/or mercapto groups, an average molecular weight of from about 500 to about 25,000 and a melting point below 60° C.;

k has an average value of from 0 to n;

h has an average value of from 0 to m;

n represents 2 or 3; and m represents an integer of from 2 to 8; characterized in that a prepolymer having isocyanate end groups is prepared in a first stage from said polyisocyanate and said compound of the formula:

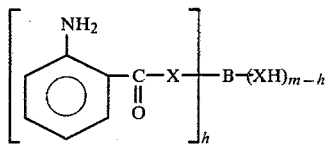

and in a second stage, this prepolymer is reacted in the absence of a solvent with said compound of the formula:

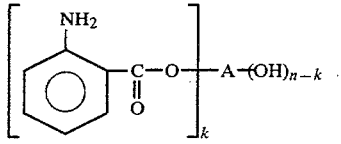

and optionally low molecular weight chain-lengthening agents and another polyisocyanate.

2. The process of claim 1, wherein the equivalent ratio of isocyanate groups to isocyanate-reactive groups is from 0.9 to 1.3.

3. The process of claim 2, wherein the equivalent ratio of isocyanate groups to isocyanate-reactive groups is from 0.95 to 1.0.

4. The process of claim 1, wherein in said second reaction stage, polyols corresponding to the following general formula:

A—(OH)$_n$ having a melting point of from 180° to 300° C. are used.

5. The process of claim 1, wherein in said second reaction stage, there are used polyesters of terephthalic acid and/or isophthalic acid and ethylene glycol, 1,4-butane diol and/or 1,6-hexane diol, which polyesters have hydroxyl end groups.

* * * * *